US012634137B2

(12) United States Patent
Singh et al.

(10) Patent No.: US 12,634,137 B2
(45) Date of Patent: May 19, 2026

(54) DATE AND TIME TOKENIZATION WITH FORMAT PRESERVATION

(71) Applicant: THALES DIS CPL USA, INC., Austin, TX (US)

(72) Inventors: Navdeep Singh, Gurgaon Haryana (IN); Rommel Pundir, Uttar Pradesh (IN); Rajesh Gupta, San Jose, CA (US)

(73) Assignee: THALES DIS CPL USA, INC., Austin, TX (US)

( * ) Notice: Subject to any disclaimer, the term of this patent is extended or adjusted under 35 U.S.C. 154(b) by 92 days.

(21) Appl. No.: 18/626,417

(22) Filed: Apr. 4, 2024

(65) Prior Publication Data

US 2025/0317294 A1 Oct. 9, 2025

(51) Int. Cl.
| | |
|---|---|
| *H04L 9/32* | (2006.01) |
| *G06F 21/60* | (2013.01) |
| *H04L 9/08* | (2006.01) |

(52) U.S. Cl.
CPC .......... *H04L 9/3213* (2013.01); *G06F 21/602* (2013.01); *H04L 9/0869* (2013.01)

(58) Field of Classification Search
None
See application file for complete search history.

(56) References Cited

U.S. PATENT DOCUMENTS

| | | | |
|---|---|---|---|
| 2015/0096039 A1* | 4/2015 | Mattsson | G06F 21/64 726/26 |
| 2018/0189502 A1* | 7/2018 | Kumar | H04L 9/0863 |
| 2022/0198059 A1* | 6/2022 | Hatcher | G06F 21/606 |
| 2022/0247563 A1* | 8/2022 | Mattsson | H04L 9/3236 |
| 2023/0359770 A1* | 11/2023 | Mcfall | H04L 9/3247 |

OTHER PUBLICATIONS

International Search Report (PCT/ISA/210) and Written Opinion (PCT/ISA/237) mailed on Jul. 1, 2025 by the European Patent Office as the International Searching Authority for current International Application No. PCT/US2025/021427 [16 pages].

* cited by examiner

*Primary Examiner* — Sanchit K Sarker

(57) ABSTRACT
A system and method to tokenize date and time data based on table shuffling and lookup index that preserves an original format of the date and time data with respect to a tokenized format. Look-up tables are generated efficiently for fast look up and indexing in memory, which may comprise one or both of date tables and time tables. The date tables consist of a year date table, a month date table, a 28-day month table, a 29-day month table, a 30-day month table, and a 31-day month table. The time tables consist of an hour table, a minutes table, and a seconds table. In some arrangements, the seed value is either a user provided seed by way of the one or more Connectors, or a master seed that by way of the one or more Connectors creates a seed chain with derivative seeds. Other embodiments disclosed.

15 Claims, 7 Drawing Sheets

100

200

300

350

400

500

COMPUTING PLATFORM 700

PROCESSING COMPONENT 702

OTHER PLATFORM COMPONENTS 704

STORAGE MEDIUM 700

COMMUNICATIONS INTERFACE 706

STORAGE MEDIUM 600

COMPUTER EXECUTABLE INSTRUCTIONS 602

DATE AND TIME TOKENIZATION WITH FORMAT PRESERVATION

TECHNICAL FIELD

The present invention relates generally to data privacy and personally identifiable information as related to software security, and more particularly, to tokenization techniques for replacing calendar dates in sensitive data.

BACKGROUND

Personally Identifiable Information (PII) is any representation of information that permits the identity of an individual to whom the information applies to be reasonably inferred. PII security controls are implemented to track sensitive data transferred within the organization, or outside it, and identify unnatural patterns that might imply a security breach. Data Tokenization is the process of generating a non-sensitive identifier for a given sensitive data element. Using tokens for storing sensitive data like PII is advantageous because the impact of a data breach is significantly minimized.

One problem solutions providers of encryption product suites often face with respect to managing PII compliance is handling calendar date data. Proper formatting and storage of calendar dates is an issue; for example, how the month, day, year, range are ordered, coded and reproduced across various applications. Moreover, strict compliance dictates that encryption is not allowed for date data. For PII compliance purposes and for enterprise security, customers of these providers need to be able to tokenize or anonymize calendar date fields in their internal database systems. But dates must be tokenized in such a way that they conform to a certain range, format and be valid dates. Such effort requires innovation and logic built into proprietary algorithms to preserve range, format and ensure that the resulting date is valid. Such a solution is beyond a simple application of an encryption algorithm.

On this point, a compounding problem is that the tokenization of data requires a mapping of original and tokenized values to be created and persisted. That is, the relationship between the original date data and the tokenized data needs to be maintained in a database system for a certain duration of time and with certain security controls, all of which are timely and costly. Furthermore, for calendar date data, this becomes a huge task to create, and maintain, a list of all the dates in a year, let alone specific time data. As a reference example, if the mapping is performed for a 200 year duration, then ~365*200=~73,000 entries will be created plus inclusion of leap year entries. This approach has limitations of requiring huge memory consumption and leading process time, limitations to support the variants of "yyyy-mm-dd" formats, and such a design is not easily scalable for formats to additionally include time data to support the variants of "hh-mm-ss" formats.

Existing format preserving solutions have difficulty in adequately preserving calendar dates in the correct range across various components that integrate applications and databases with core encryption, tokenization, and key operations. Moreover, format preservation of date data is a challenge because tokenization is currently a centralized service that is designed and hardened with fault tolerance, scaling, and failover considerations. Although generated in a centralized manner, tokens can be used indefinitely without the need to retokenize, but this is because tokens are generated by a centralized server, which doesn't require rotation or management of encryption keys.

Some tokenization solutions require a central server to tokenize and detokenize data. For example, U.S. Patent Application US2022/0058636 A1 discloses a tokenization platform that utilizes smart contracts for facilitating token-based transactions for items is disclosed. However, it does not necessarily address issues calendar date tokenization. The system includes an item management system that generates a virtual representation of an item based on item attributes thereof and that generates a smart contract that defines conditions for self-executing a transaction relating to the item. If facilitates token-based transactions by generating a virtual representation of the item based on the set of item attributes and generating a smart contract that defines a set of verifiable conditions that must be satisfied in order to self-execute a transaction relating to the virtual representation. It does not however address a non-centralized approach to tokenization that is interoperable across components.

Some solutions support tokenization for generic plaintext. For example, U.S. Pat. No. 8,763,142B2 is directed to use of tokens as substitutes for confidential information in corporate enterprise systems. Other solutions use format preserving encryption for date tokenization or implement existing solutions that format date and time. For example, U.S. Patent Application US2007/0276765A1 describes methods for performing settlement of token access of secured transactions and batch processing of token transactions. Authorization for transactions can be stored for batch settlement. A routing means is contemplated whereby centralized decryption can be implemented to provide centralized key management or centralized of other encryption algorithms or information. Secure transaction modules at various gateways, or elsewhere in the processing network, are configured to share generated data with one another or provide them to a central repository. Here too, component tokenization appears to rely on a central tokenization server that does not take into account limitations of transaction performance caused with centrally located tokenization.

All of the subject matter discussed in this Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

SUMMARY

Provided herein is a software centric mechanism to tokenize date and time values based on table shuffling and lookup index. In one arrangement, a generated ordering of dependent date tables is performed that starts first with a year date table, then a month date table, and then a day date table. The steps of generating a date table starts with the year date table, and then is repeated for the month and days. The date tables are dependent on one another consequent to the generated ordering of the date tables individually. The generated month table depends on the preceding year date table, for example, to account for leap years. The generated day date table is one with 28, 29, 30 or 31 days depending on the preceding month date table.

In some embodiments, disparate software connectors of a product suite each receive parameters from a global policy, and generate a set of look-up date tables (one table for year, one table for month, and up to four tables for 28-day, 29-day, 30-day and 31-day entries). From these parameters, the look-up date tables are shuffled in a reproduceable manner in accordance with the policy and based on table shuffling and lookup index, and then tokenize and detokenize sensitive data using the set of look-up date tables. Here, connectors are a family of software components associated with a product suite that integrate applications and databases with encryption, tokenization and cryptographic key operations.

The scrambled look-up date table is unique to each software connector for performing local tokenization and detokenization of dates. The date table is uniquely generated to support cross platform integrations of various disparate containers, each with their own programming language, Application Programming Interface (API), and user supplied information to configure the connector for that container. Each individual connector locally creates its own scrambled look-up table from parameters in the policy, thereby allowing the container to locally perform consistent and reproduceable tokenization and detokenization of calendar date data that container handles by way of its scrambled look-up table. In this manner, different container types can be communicatively coupled to each other to tokenize/detokenize dates with equivalent results.

This approach allows customers to replace sensitive date and time data with equivalent non-sensitive information without compromising security. The solution is format-preserving in that the substitution date token is generated in the same format as the original date and within a specified range to allow insertion into an existing database schema thereby preserving constraints and existing application workflows. The solution is both forward and reversible in that a customer can substitute and store non-sensitive token data on disk to minimize exposure and only allow certain users or processes to retrieve the real, sensitive data on a time-limited basis

BRIEF DESCRIPTION OF THE DRAWINGS

The accompanying drawings, which are incorporated in and constitute a part of this description, illustrate embodiments consistent with the invention and, together with the description, serve to explain the principles of the invention.

Specific embodiments in this invention have been shown by way of example in the foregoing drawings and are hereinafter described in detail. The figures and written description are not intended to limit the scope of the inventive concepts in any manner.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Briefly, the term "tokenization" is generally the process of replacing sensitive data with unique identification symbols. It exchanges sensitive data for non-sensitive data called "tokens" that can be used in a database or internal system without revealing the sensitive data. While there are no tokenization standards in the industry, most tokenization solutions fall into one of two architectures: vault-less or vaulted tokenization.

Herein, the term "connector(s)," is/are considered a software component designed to bridge the communication gap between applications, systems, or services. Connector types include database connectors, data connectors, message connectors, event connectors, procedural connectors, calling connectors and Applications Programming Interface (API) connectors. Their primary objective is to facilitate smooth integration of applications and the flow of data between these components, to efficiently synchronize data securely and effortless.

Figure 1:
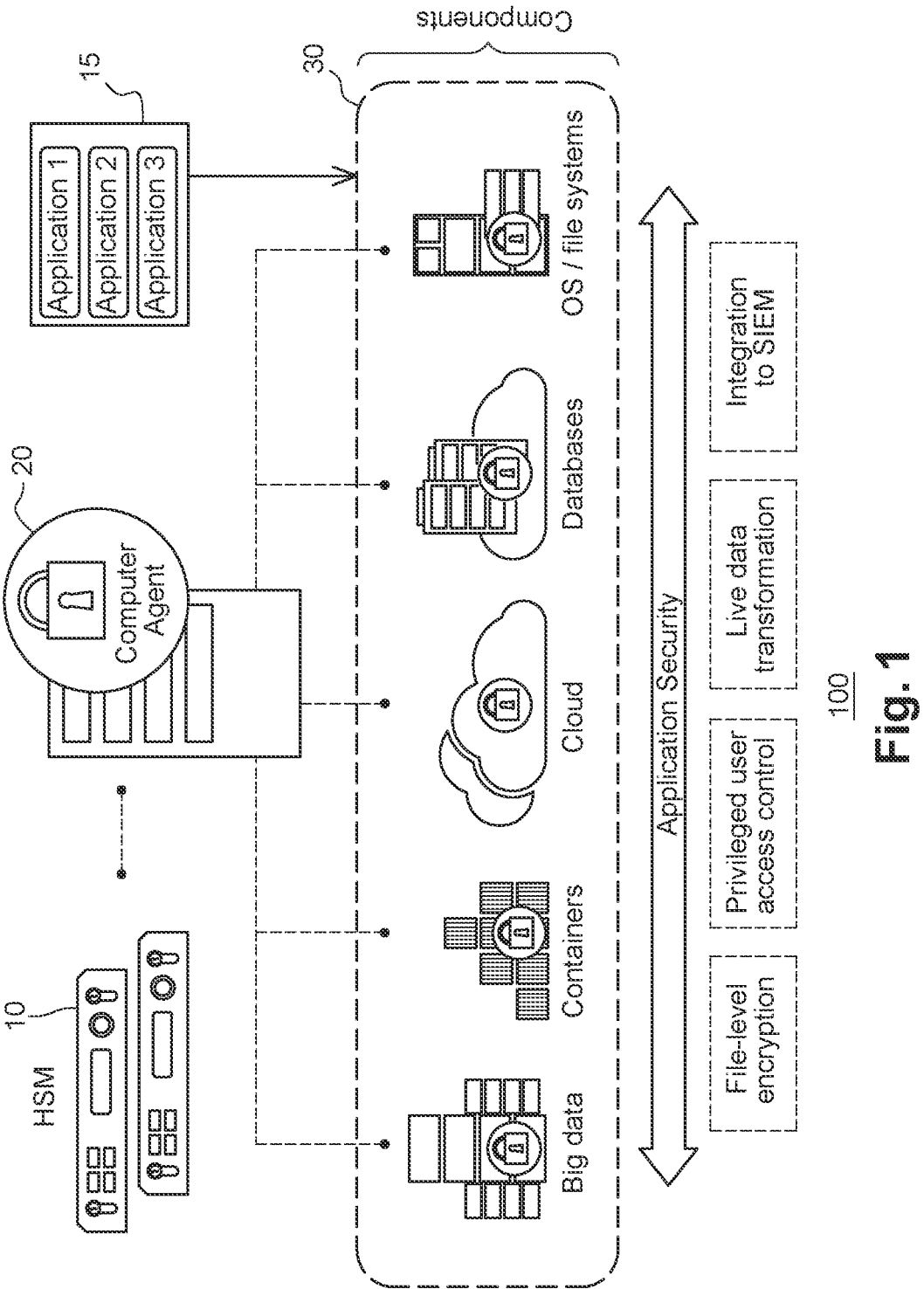
FIG. 1 depicts a data-centric system for safeguarding and securing data that includes format preserving tokenization of calendar dates in accordance with embodiments.

Referring to FIG. 1 a data privacy centric system 100 for safeguarding and securing data as it moves from networks to applications and the cloud is shown. The system 100 integrates centralized key management with data protection and granular access controls. It discovers and classifies sensitive data, combats external threats, guards against insider abuse, and establishes persistent controls, even when data is stored in the cloud or in any external provider's infrastructure for on-prem and cloud-based data. In support of key lifecycle management, hardware and virtual appliances are leveraged, which are communicatively coupled to system components. The Hardware Security Module (HSM) 10 is one exemplary physical device to provide secure management of sensitive data, such as keys, which can be configured as a root of trust for the system 100 and for verifying chains of key encryption keys.

The Computer Agent 20 is one component of the trust data security platform to protect and control an organization's sensitive data within system 100. It increases data security, accelerates time to compliance, secures cloud migration, delivers data-at-rest encryption, privileged user access controls and detailed data access audit logging among other features. It does this to reduce security risk and maintain strong data security. The Computer Agent 20 can be deployed or installed to execute within major infrastructure components 30 in order to secure sensitive data across changing environments and increasing threats, for example, Big Data, Containers, Cloud, Databases and Operating System (OS) File Servers. This is necessary because the typical enterprise today uses multiple IaaS or PaaS providers, along with numerous SaaS applications, big data environments, container technologies, and their own internal virtual environments.

Among other security features and data protection services, the Computer Agent 20 provides for calendar date and time tokenization of data that is shared, stored or distributed amongst one or more of these infrastructure components 30, each of which may host or run any number of local or remote applications 15. The applications 15 may be user applications of almost any type requiring date tokenization, for example, in compliance with PCI DSS, such as word processing programs, spreadsheet programs, and collaboration tools, application software, or endpoint management applications and administrative programs executing on any of components 30, or any other type of computer or server-based application. These applications 15 can run on the components 30, including, but not limited to, virtual machines, containers, databases, files systems, servers, computers or other cloud service offerings.

Here, data and date/time tokenization reduce the cost and effort required to comply with security policies and regulatory mandates like PCI DSS while also making it simple to protect other sensitive data including personally identifiable information (PII). With format-preserving tokenization, a token is exchanged for the original value, but the token respects the format of the original value. If the format of the token is the same as the original value, then the tokenization process is format-preserving. Tokenization of application date/time data occurs primarily by way of Connectors (described next in conjunction with FIG. 2) associated with Components 30 and Computer Agent 20 working together, whether in the data center, big data environments or the cloud. In some embodiments the date/time tokenization is performed alone by a component 30 utility, a connector 40 utility or combination thereof.

Figure 2:
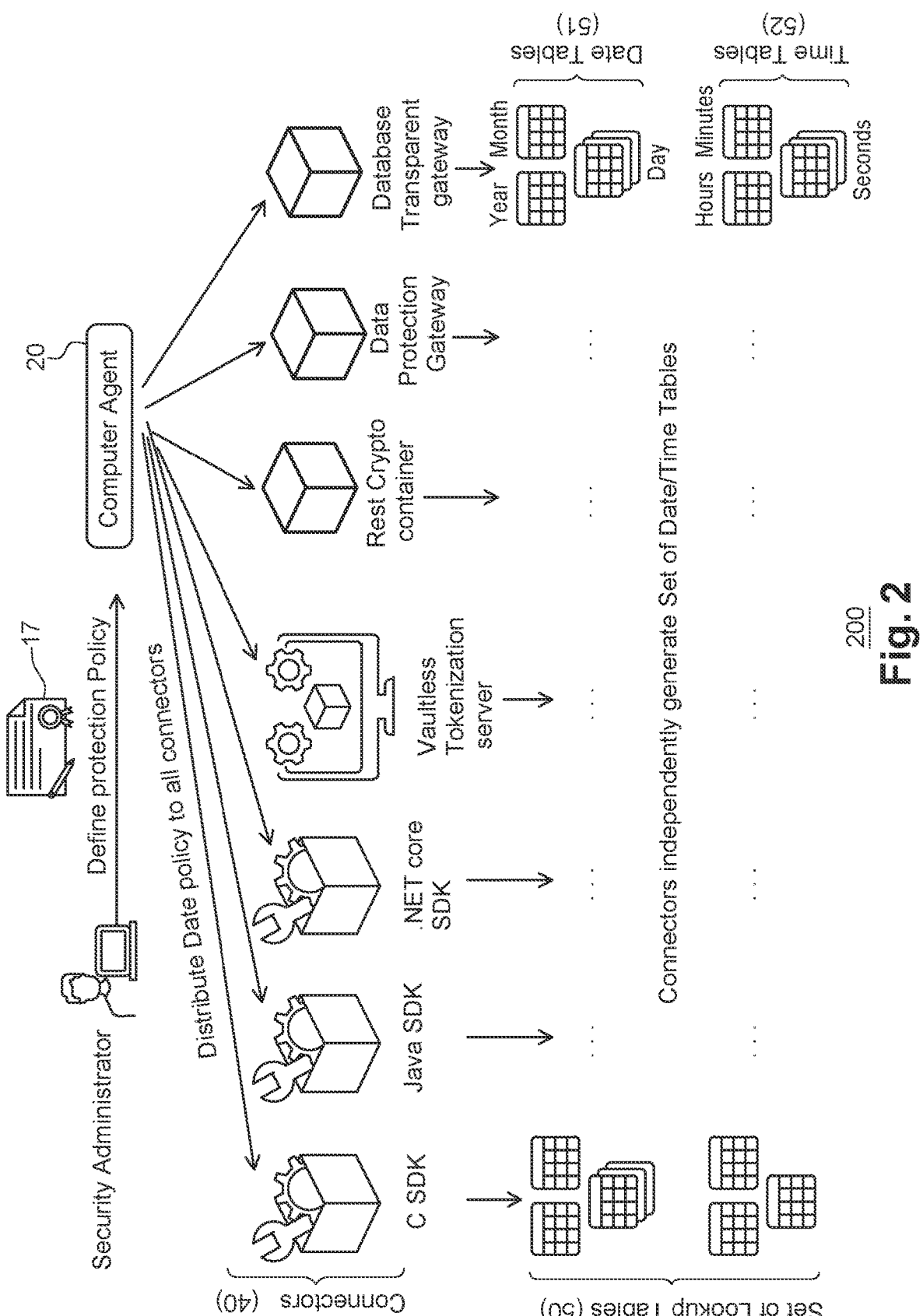
FIG. 2 depicts a diagram for distribution of a global date policy to connectors in accordance with some embodiments.

FIG. 2 depicts a diagram 200 for distributing a global protection policy 17 to connectors 40 in accordance with some embodiments. Here, a security administrator or other user, first defines terms and conditions in the global protection policy 17 for tokenizing calendar data (including date and time), that describes how the connectors 40 (or other components 30) should tokenize date and time entries. This can include the table generation details, how the seed is selected, which shuffling algorithms to use, how indexes are referenced, and other logic routines associated with date/time tokenization. As illustrated, the protection policy 17 is provided to the Computer Agent 20, which then distributes it to the one or more connectors 40. Each connector can thereafter independently generate its own set of lookup tables 50 in view of the global date policy 17.

Briefly, the set of look-up tables 50 comprises the date tables 51 and the time tables 52. As illustrated, the date tables 51 consist of a year date table, a month date table, a 28-day month table, a 29-day month table, a 30-day month table, and a 31-day month table. The time tables 52 consist of an hour table, a minutes table, and a seconds table. Notably, what has been done here, is that instead of entirely tokenizing a particular date value as a whole representation of day, year and month, it has been broken down into an independent combination of day, month and a year. The date value elements are divided into a separate year, month and day, and then a table is generated for each of them. The time tables take a similar approach in that they are divided into hours, minutes and seconds tables. For a simple representation of a date value there are six tables; one year is a year table, one is a month table and then there are four more day tables depending on the number of days in a particular year. The use of six tables reduces the scope of the tokenization and associated table indexing, and results in smaller (lightweight from a memory storage and access perspective) tables for date formats of these kind. In comparison to a single table tokenization approach, this break-down approach of using separate entry date and time tables results in substantially less processor look up indexing with respect to processor performance and time.

In accordance with some embodiments, the Connectors 40 are disparate utilities that may be, or include, one or more of a C SDK, a C++ SDK, a Java SDK, a .NET core SDK, a Vault less Tokenization server, a RESTful Crypto container, Data Protection Gateway and a Database Transparent gateway. Other connector types are contemplated for virtual machines (VMs) performing tokenization operations that communicate with other containers or cloud access security brokers (CASBs) and proxies responsible for their own tokenization and specific encryptions, such as XCBC and XECB, are supported. In some configurations, Connectors 40 connect with the Computer Agent 20 to retrieve centrally protected keys to be used for encryption and a global policy for tokenization.

In one arrangement, the Computer Agent 20 may be a remote manager in the form of a web browser or installed application to support cross-platform integration of connectors 40, and for clients to access and configure the service components and services (e.g., Big data, Containers, Cloud, Databases, File Systems, etc.) of system 100 (in FIG. 1). The Computer Agent 20 provides a unified management console that enables users (e.g., admins, solutions providers, vendors, or clients to develop applications using the one or more Connectors 40) to discover and classify sensitive data, and protect data using the integrated set of format preserving date Connectors across on-premises data stores and multi-cloud deployments In some embodiments, a security administrator defines a global date policy 17 that is registered and stored on the Computer Agent 20, which then distributes and shares this date policy 17 with all the installed connectors. This can occur automatically as part of an installation process for each connector or via manual operations. As an example, one component of the Computer Agent 20 may be directed to encryption services that may encompass multiple software providers requiring date/time tokenization on various platforms each requiring their own connector 40 associated with a specific Software Development Kits (SDK), where each one runs native to particular programming languages (e.g. C, C++, Java, .Net, etc.).

The global date policy 17 includes date and/or time parameters that each connector can use to generate their own specific date look-up table 51 and time look-up table 52. The policy 17 is a collection of rules that govern data access and encryption/decryption supplemented with date/time parameters. It specifies actors (e.g., users, groups and processes that are permitted/denied access to protected data), and actions authorized users are allowed to perform, for example, create/delete, read/write, decrypt, modify permissions, and so on Policy rules are processed sequentially. If the criteria of rule one is not met, the policy enforcement engine moves on to the second rule and so on.

When creating a policy, the system administrator (or user of a service by way of the Computer Agent 20) specifies security rules, key rules, and data date/time transformation rules that apply to the policy. At least one key or security rule is generally required to be added to a policy. The Computer Agent 20 distributes the policy 17 to all connectors 40, or containers, and the key is used to encrypt the policy and data. For date/time tokenization/detokenization, the user can specify a date/time format, a valid date/time range (optional), an encryption key and a seed from the Computer Agent 20.

Each Connector 40 independently generates its own set of look-up tables 50 during am initialization phase with the parameters specified in the policy 17; namely, the date/time format, the date/time range and the seed. They also specify an encryption, cipher suite or key from the global policy 17. These parameters uniquely specify how the look-up tables are generated, and because these parameters are distributed to each connector, that allows each connector, with a same seeded RNG, to generate the same date table with a same shuffling order as other connectors. This way, regardless of where a container (and associated connector 50) is installed or later resides, it can tokenize and detokenize date/time data to a consistent set of of dates and times.

The interoperability of connectors 40 for date/time tokenization as described herein and amongst different container types of components 30 in the system 100 is a unique solution that broadens leverage and practical use for a centralized product. It supports the Central Area Data Processing (CADP) use case of central management and protect/reveal policies. The parameters are centrally defined on the Computer Agent 20 (e.g. HSM resource manager, encryption services manager, etc.) as a global protection policy, which is automatically distributed to containers and system components 30. This allows it to encrypt with one connector, and decrypt with any other connector. Allowing the connectors to individually generate their own date/time tables (51/52) for tokenization is advantageous from a time and processing viewpoint. Whereas a centralized server would otherwise generate, replicate and distribute large size date tables to connectors requiring large data bandwidth with slow response time, here, the server need only distribute the lower size protection policy 17 with parameters to each connector 40 that then independently generates the date/time tables (51/52), thereby requiring less data bandwidth and faster response time.

Figure 3A:
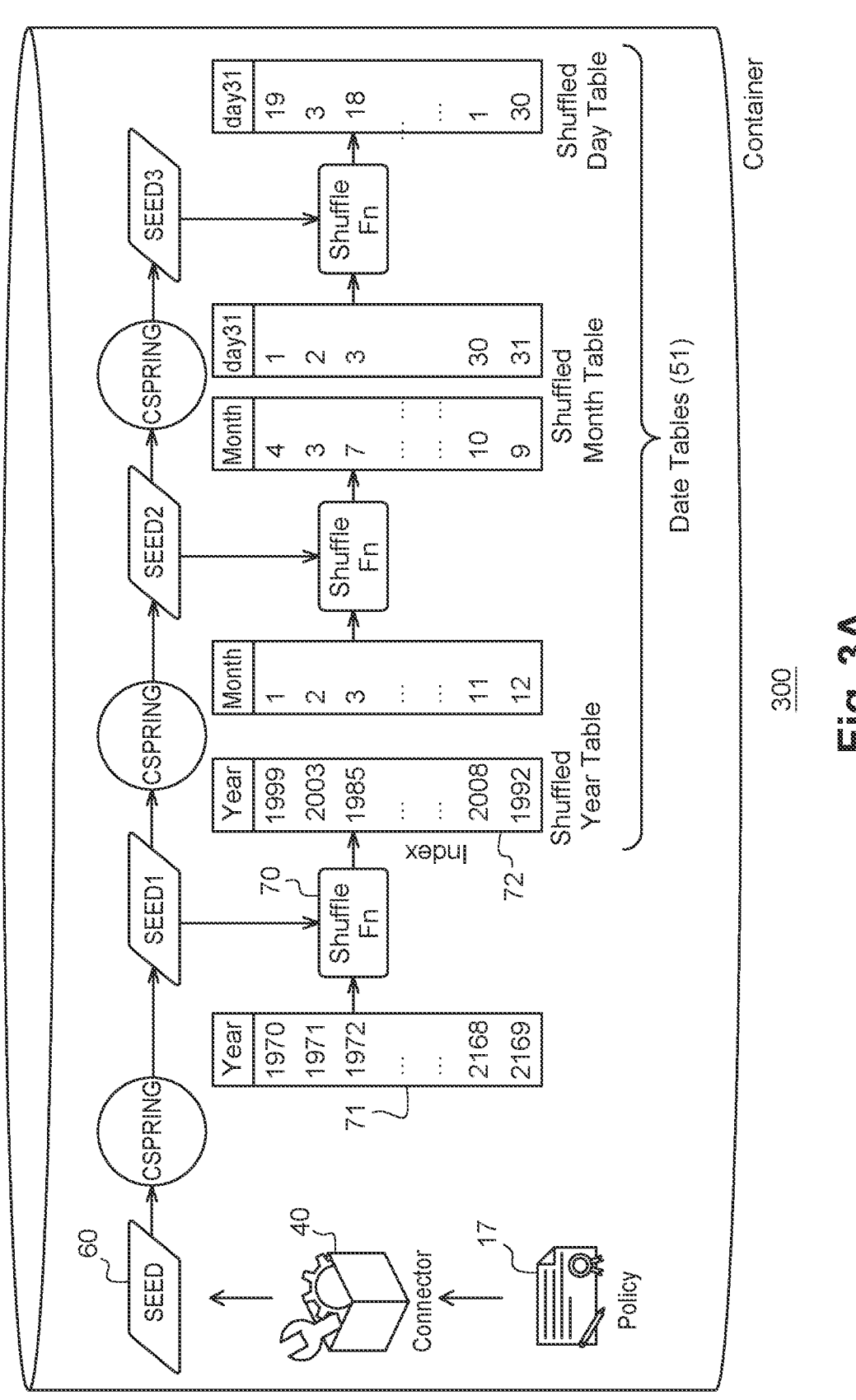
FIG. 3A depicts an exemplary container to tokenize date and time values based on table shuffling and lookup index in accordance with some embodiments.

FIG. 3A depicts illustrative steps associated with the generation of a set of look-up tables, in this example case, within a container 300, for instance as a Docker container. In this illustration, only the date tables 51 are shown for description purposes, but the time tables 52 are generated similarly. Here, the connector 40 associated with container 300 retrieves data parameters from the policy 17, which include the data format (e.g. YYYY-MM-DD, mm_dd_yy, etc.), the date range (e.g. Jan. 1, 2024 to Dec. 31, 2025), the encryption key (optional), the seed and shuffling function. The connector 40 generates all possible dates in that date range into the date tables 51 for the container from this information.

The shuffling function can be an Random Number Generator (RNG) or other known scrambling paradigm, such as, one based on Fisher Yates or Quick Unsort. The seed value 60 is either a user provided seed by way of the one or more Connectors 40, or a master seed used to create a seed chain with derivative seeds (e.g. SEED 1, SEED 2, SEED 3, etc.). The seed is a numeric value serving as input to the shuffling function in order for a respective connector 40 (or component 30) to purposefully generate a reproduceable pseudo random number when needed. This reproducibility of the random number for the shuffling function ensures that each connector 40 will be able to generate a shuffling order for the look-up tables 50 that is consistent across each of the connectors 40 individually, and accordingly across containers.

Here, date and time data is tokenized based on table shuffling and lookup indexing that preserves an original format of the date and time data with respect to a tokenized format. The connector 40 reads the global parameters from the policy 17, and generates the set of look-up tables 50 in view of the global parameters. It does this for each date table by a) ordering original values of date or time data in a first column, wherein the first column 71 serves as an index for tokenization of the original values. The ordering of the first column to the year entry of original values is shown as linearly increasing (1970 to 2169), and is the default, but may differ based on the parameters of the policy 17. Similarly the first column for the month and day entries is default linearly increasing, but could be a different order according to the policy 17. A global parameter can indicate the ordering, the shuffling function, and/or whether the seed value is obtained from a user application 15, a component 30 or a connector 40. It then b) shuffles the original values using a seed value 60 and a shuffling function 70 to produce a random ordering of tokenized values in a second column 72, wherein the second column serves as the index for detokenization of said tokenized values. In this illustration, that creates the shuffled year table shown. It then repeats these steps of a) ordering and b) shuffling for the remaining look-up tables; namely, the shuffled month table and the shuffled day table. This approach is applied similarly for the generation of the time tables. For each date and time table, the values in the randomized $2^{nd}$ column are generated by shuffling the values in the $1^{st}$ column using a user provided seed value, for example, where F is the chosen shuffle function:

$$(\text{row } n, \text{column } 2) = F(\text{seed}, (\text{row } n, \text{column } 1))$$

As one example process, in view of FIG. 3A tables, for an original value date entry of Mar. 1, 1970 with format YYY-MM-DD, where YYYY=1970, MM=3 and DD=1, a tokenization results in a tokenized date value of 1999 Jul. 19 of a same format corresponding to Jul. 19, 1999.

Figure 3B:
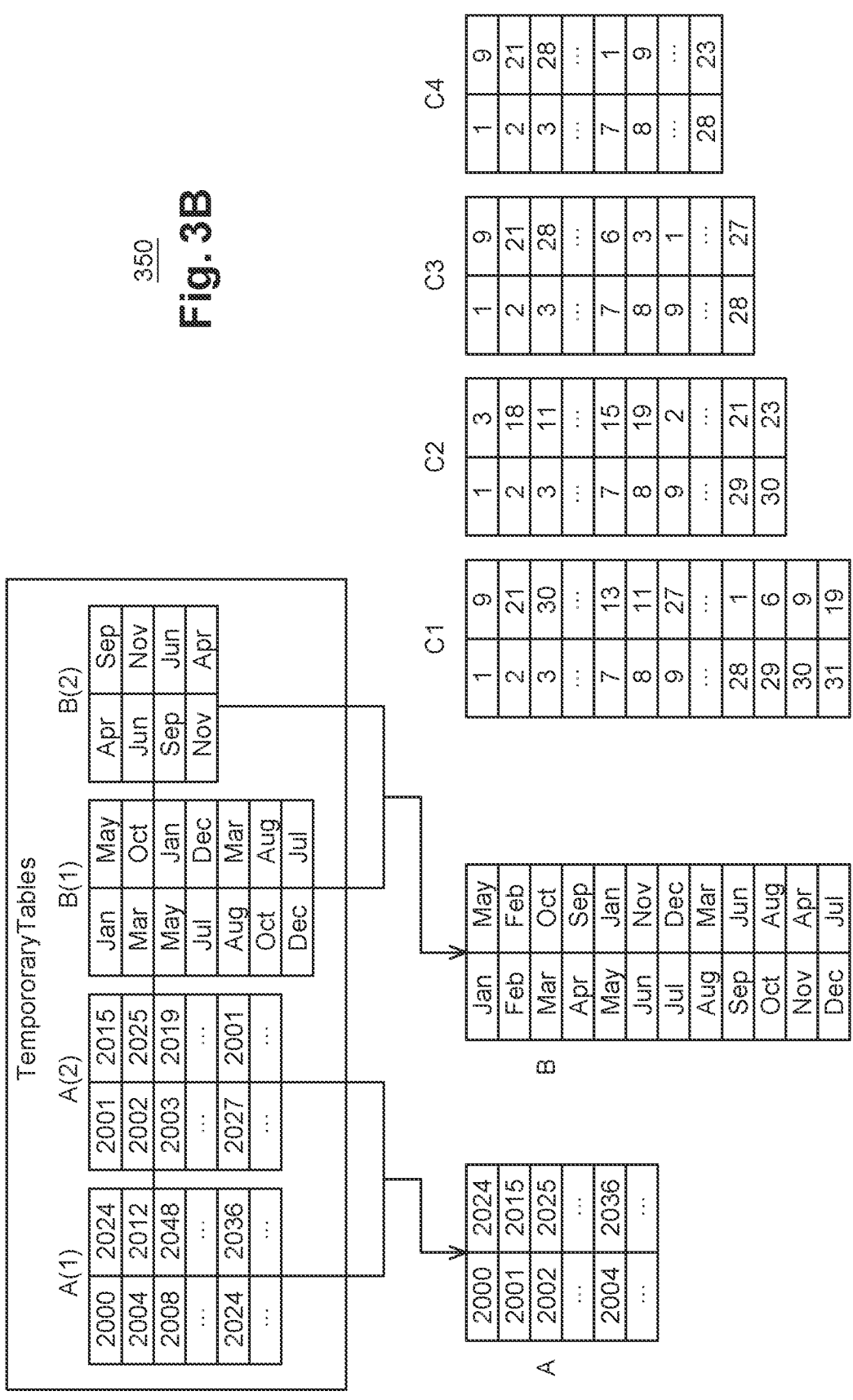
FIG. 3B depicts an exemplary set of date tables for years, months and days in accordance with some embodiments.

FIG. 3B depicts an exemplary set 350 of generated date tables for years, months and days in accordance with some embodiments. Here, the date in leap year specifically maps to date in leap year, which ensures that a non-leap year date does not result in a 29th February month assignment entry. Here also, a month with 30 days maps to a month with 30 days, which ensures that an invalid date, like Sep. 31, is not generated. This generative mechanism of table creation allows the implementation described above to skip tokenizing of any of the date elements—year, month, day. In this arrangement, the corresponding date table is not shuffled. This approach is extensible to different time elements similarly.

For the Year Table, in a first step, a temporary table A (1) is created to contain an ordered list of LEAP years along with shuffled values. In a second step, a temporary table A (2) is created that contains an ordered list of non-LEAP years along with shuffled values. In a third step, tables A (1) and A (2) are merged to create table A which will serve as Year lookup table. In a fourth step, the tables A (1) and A (2) are deleted. These steps are performed by the connectors 40 of a respective computer agent 20 as seen in previous figures.

For the Month Table, in a first step, a temporary table B (1) is created to contain an ordered list of months containing 31 days along with shuffled values. In a second step, a temporary table B (2) is created to contain an ordered list of months containing 30 days along with shuffled values. In a third step, tables B (1) and B (2) are merged to create table B to serve as Month lookup table. The Month 2 (February) will always map to itself. In a fourth step, tables B (1) and B (2) are deleted. These steps are also performed by the connectors 40 of a respective computer agent 20 as seen in previous figures.

For the Day Tables, in following steps, table C (1) is created to contain an ordered list of days from 1 to 31 along with shuffled values; table C (2) is crated to contain an ordered list of days from 1 to 30 along with shuffled values; table C (3) is created to contain an ordered list of days from 1 to 29 along with shuffled values; and, table C (4) is created to contain an ordered list of days from 1 to 28 along with shuffled values.

Figure 4:
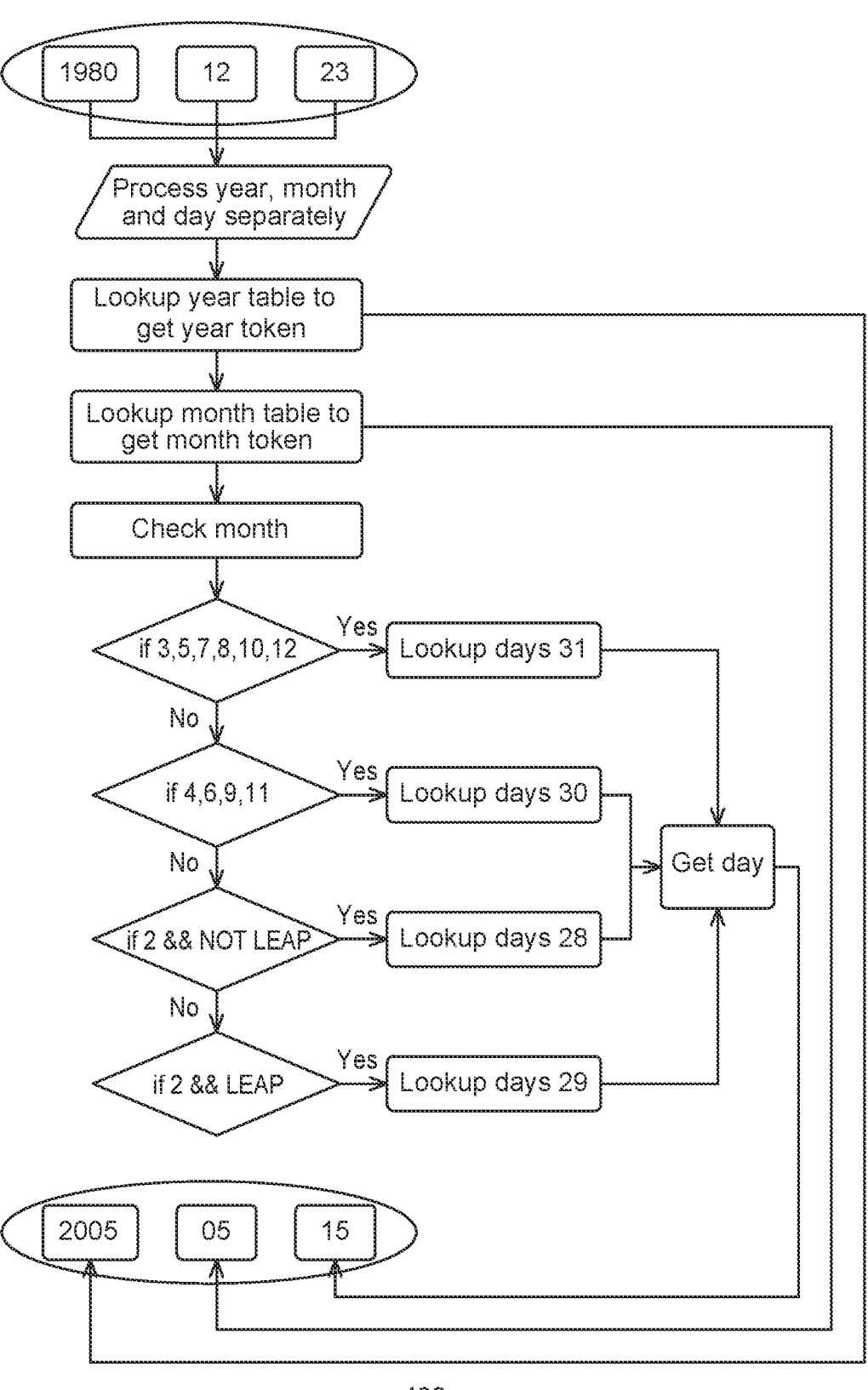
FIG. 4 illustrates a flow-chart to tokenize date and time values based on table shuffling and lookup index in accordance with some embodiments.

FIG. 4 illustrates a flowchart 400 to tokenize date and time values based on the disclosed table shuffling and lookup index approach in accordance with some embodiments. This flowchart 400 is applicable for use after the date table 51 and time table 52 has been generated as previously described. The flowchart 400 can be implemented by way of the one or more connectors 40, components 30, or other modules implementing the tokenization/detokenization algorithms described herein. As illustrated, the one or more connectors 40 processes a date entry (e.g. Dec. 23, 1980) to produce a separate year (1980), month (12) and day (23) value. In this separated format, it looks up a year token (e.g. 2005) for the corresponding year value (e.g. 1980) in the year date table, looks up a month token (e.g. 05) for the corresponding month value (e.g., 12) in the month date table and then makes a day table evaluation for the corresponding day value (e.g. 23). If the month token is 1, 3, 5, 7, 8, 10 or 12, it looks up a day token for that day value in the 31 day table. If the month token is 4, 6, 9 or 11, it looks up a day token for that day value in the 30 day table. If the month token is 2 and year token is not a leap year, it looks up a day token for that day value in the 28 day table. If the month token is 2 and year token is a leap year, it looks up a day token for that day value in the 29 day table. This procedure produces a tokenized date value (e.g., May 15, 2005) in a same format (YYYY-MM-DD) as the original format (YYYY-MM-DD) of the date data for said date entry (e.g. Dec. 23, 1980). The notable points are that it accommodates first for the month depending on whether it is a leap year, and then determines which of the four day tables to use for lookup.

Similarly, the one or more connectors 40 processes a time entry for separate hours, minutes and seconds value, looks up a hours token for the hours value in the hour date table, looks up a minutes token for the minutes value in the minute date table, and looks up a seconds token for the seconds value in the seconds table. This produces a tokenized time value in a same format as the original format of the time data for the time entry. Although example time tables are not shown, one can imagine for an original time entry of 2:45:11 AM EST with format HH-MM-SS-BB-ZZ, where HH=2, MM=25, SS=1, BB=AM, ZZ=EST, results in a tokenized time value of 11:43:23 PM GMT that corresponds to 11-43-23-PM-GMT.

In some embodiments, after the date tables 51 are generated, the one or more Connectors 40 performs steps of: breaking down a date value into individual entries for year, month and day, tokenizing the date value in each date look-up table, and then repeating the tokenizing for individual entries of remaining date look-up tables, thereby producing, a tokenized date value from the format preserved representation of the date value that obfuscates the year, month and day of said date value in a same format. The method steps for date value tokenizing comprises: looking up the individual entry in the first column of a respective date look-up table, identifying the index in the first column for said individual entry, looking up a corresponding tokenized individual entry in the second column using said index, and then presenting the corresponding tokenized date as a format preserved representation of the date value.

After the original date values have been tokenized as described in the paragraph above, the one or more Connectors 40 performs reverse steps for detokenization; namely, breaking down the format preserved representation of the tokenized date value into individual entries for year, month and day, detokenizing the corresponding tokenized date in each look-up table by looking up the corresponding tokenized date in the second column, identifying the index in the second column for said corresponding tokenized date, looking up the date value in the first column using said index, and then presenting the date value that represents the obfuscated year, month and day of the tokenized date value.

In some embodiments, after the time tables 52 are generated, the one or more Connectors 40 performs steps of: breaking down a time value into individual entries of hour, minutes and seconds, tokenizing the time value in each time look-up table, and repeating said tokenizing for individual entries of remaining time look-up tables, thereby producing, a tokenized time value from the format preserved representation of the time value that obfuscates the hour, minutes and seconds of said time value in a same format. The method for time value tokenizing comprises looking up the individual entry in the first column of a respective time look-up table, identifying the index in the first column for said individual entry, looking up a corresponding tokenized individual entry in the second column using said index, and then presenting the corresponding tokenized time as a format preserved representation of the time value.

After the original time values have been tokenized as described in the paragraph above, the one or more Connectors 40 performs reverse steps for detokenization; namely, breaking down the format preserved representation of the tokenized time value into individual entries for hours, minutes and seconds, and detokenizing the corresponding tokenized time in each look-up table by: looking up the corresponding tokenized time in the second column, identifying the index in the second column for said corresponding tokenized time, looking up the time value in the first column using said index, and presenting the time value that represents the obfuscated hours, minutes and seconds of the tokenized date value.

Notably, the described mechanism for date and time tokenization based on table shuffling and lookup index is independent of both the shuffling function (e.g. RNG, Fisher Yates, Quick Unsort, etc.) and the seed (whether user provided, policy provisioned, or derived by a master key). This allows for the use of any shuffling function, flexibility for seed selection, and customization of security control. With this design, any shuffling function can be specified as well as the choice of the seed, which remains with the user, including decisions for how they generate the seed, how secure their seed is, and what security controls to implement.

Advantages of the format preserving tokenization of date data described above allows for connectors across various applications and/or containers to perform encryption and decryption on data whilst maintaining compliance with data privacy laws and regulations. Also, the policy 17 can be defined centrally on the computer agent 20 and distributed automatically to every connector 30. Another advantage is data backup; namely, that so long as protection on the policy is maintained, the computer agent 20 can restore tokenized and encrypted data at any time in the future. The data is always available to be detokenized as long as the policy information, and corresponding data parameter inputs are backed up and available.

Moreover, this type of approach tends to be faster than encryption solutions then just tokenization in general. Encryption solutions aren't an appropriate choice because it does not provide the user with a transformed value in a particular range of date and time as the proscribed tokenization approach herein. Moreover, users don't need to change their schema or their code because the date range that they receive back from detokenization is guaranteed to be within their specifications. Moreover, security conscious customers can supply and provide their own tweaks for the shuffling function as additional entropy, which may be stored centrally. As previously mentioned, performance savings are noted because date and time tables are generated locally on a connector, rather than replicated, reproduced and distributed from a central location. Although policy distribution is centralized, the date and time tables are not, which this saves time and cost due to overhead savings otherwise associated with customers having to coordinate communications amongst disparate connectors and containers for date tables in a centralized environment.

In other embodiments, a Kernel Driver may be provided as a piece of software that enables communication between an operating system (OS) and specific hardware devices, for example the OS of a virtual machine of a container 30 or connector 40 on which the Computer Agent 20 executes in accordance with its data protection and encryption policy, including date tokenization parameters. The Memory 25 is system memory, such as physical RAM or even virtual memory, which is separate from a storage device, such as a hard drive or disc. The Memory 25 provides for system storage including the cache of system applications 15, for example, instructions and data the machine needs to execute programs and processes, and also the date table 51 and shuffled date table 52 as it is being generated. For security, date tables 51/52 are created as virtual files in memory 25 dynamically. These virtual files are created in a directory of the memory 25 which looks like normal "physical" files to any user or application, but these "virtual" files will not reside on a physical disk.

Furthermore, for improved indexing performance, the data look-up table 51 and shuffled date table 52 are temporarily stored in system memory and not stored on persistent hard disk, and can be further encrypted with a key unique to each installation of said one or more Connectors 30. The Computer Agent 20 and one or more Connectors 30 comprise one or more processors and memory coupled to the one or more processors, wherein the memory includes one or more partitions and computer instructions which when executed by the one or more processors causes the one or more processors to perform said steps and operations.

Briefly, the Computer Agent 20 and associated modules (e.g. Container 30, Connector 40, etc.) can include one or more processors and memory coupled to the one or more processors, wherein the memory includes computer instructions which when executed by the one or more processors causes the one or more processors to perform the method steps and operations described. They may be connected over the network to other machines via a network communication device interface. Dedicated hardware implementations including, but not limited to, application specific integrated circuits, programmable logic arrays and other hardware devices can likewise be constructed to implement the systems, devices and methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

Figure 5:
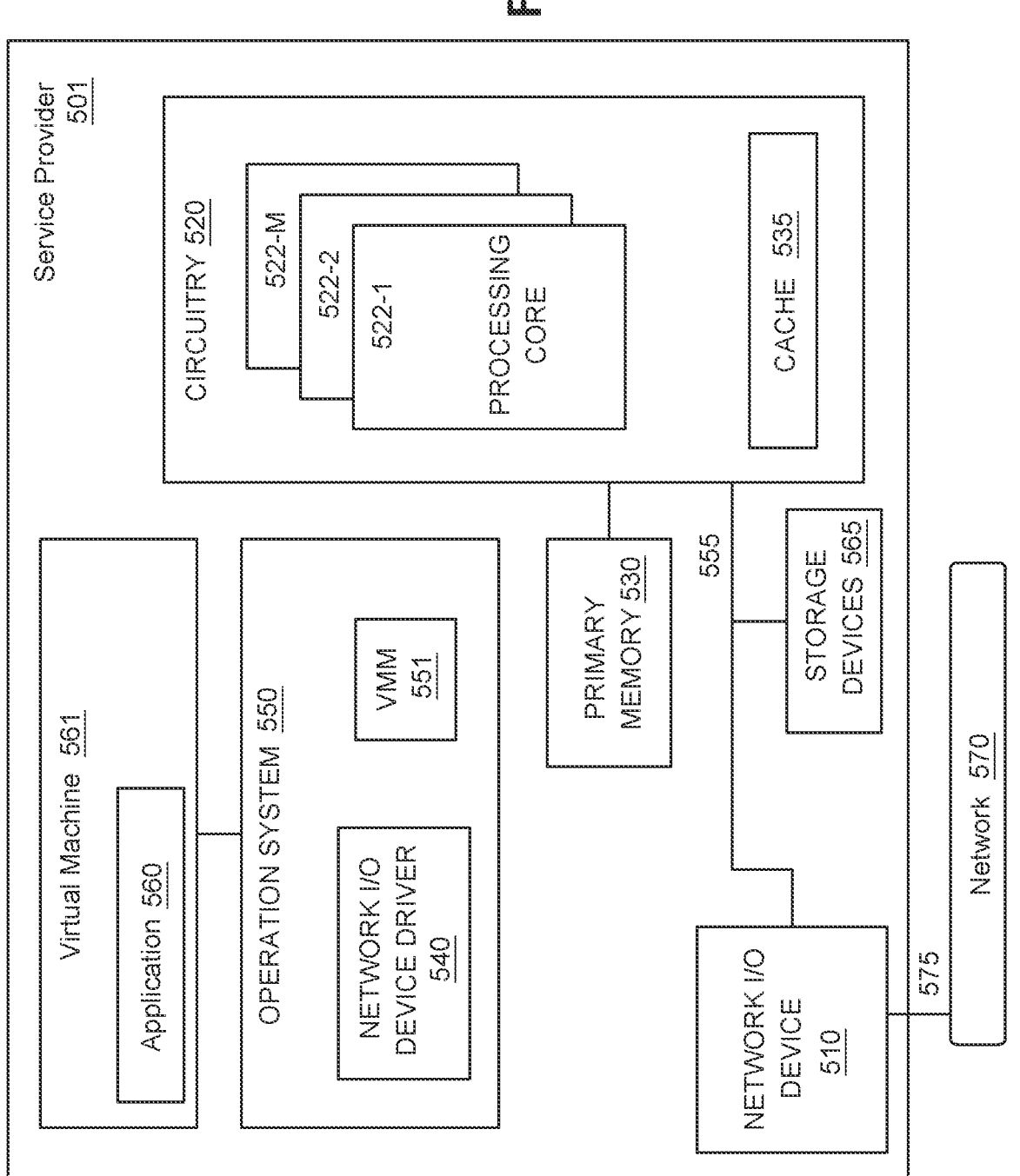
FIG. 5 illustrates an example of a computing system suitable for use with format preserving tokenization of calendar dates in accordance with some embodiments.

FIG. 5 shows an exemplary service provider 501 (e.g. suitable for use as a component 30 of FIG. 1) that includes circuitry 520, primary memory 530, operating system (OS) 550, Network (NW) I/O device driver 540, virtual machine manager (VMM) (also known as a hypervisor) 551, at least one application 560 running in a virtual machine (VM) 561, and one or more storage devices 565. In one embodiment, OS 550 is Linux™. In another embodiment, OS 550 is Windows® Server. Other OSs may also be used. In an embodiment, application 560 comprises one or more of a cloud license manager service having one or more smart license automatic detach policies. Network I/O device driver 540 operates to initialize and manage I/O requests performed by network I/O device 510. In an embodiment, packets and/or packet metadata transmitted to network I/O device 510 and/or received from network I/O device 510 are stored in one or more of primary memory 530 and/or storage devices 565.

In some embodiments, the service provider 501 provides the infrastructure for the the data-centric system 100 of FIG. 1 for safeguarding and securing data that includes format preserving tokenization of calendar dates in data, including, but not limited to, HSMs, 10, Computer Agent 20, Applications 15, and Components 30, and also Connectors 40 in FIG. 2.

In at least one embodiment, storage devices 565 may be one or more of hard disk drives (HDDs) and/or solid-state drives (SSDs). In an embodiment, storage devices 565 may be non-volatile memories (NVMs).

In some examples, as shown in FIG. 5, circuitry 520 may communicatively couple to network I/O device 510 via communications link 555. In one embodiment, communications link 555 is a peripheral component interface express (PCIe) bus conforming to version 3.0 or other versions of the PCIe standard published by the PCI Special Interest Group (PCI-SIG).

In some embodiments, the storage devices 565 is a disk storage for storing non-sensitive data such as the format preserving tokens representing date date, and associated encrypted data related to primary account numbers (PANs) or personally identifiable information (PII).

In some examples, operating system 550, network I/O device driver 540, VM 561, and application 560 are implemented, at least in part, via cooperation between one or more memory devices included in primary memory 530 (e.g., volatile or non-volatile memory devices), storage devices 565, and elements of circuitry 520 such as processors with processing cores 522-1 to 522-$m$, where "m" is any positive whole integer greater than 2. In an embodiment, OS 550, VMM 551, network I/O device driver 540, VM 561 and application 560 are executed by one or more processing cores 522-1 to 522-$m$.

In some embodiments, the HSMs, 10, Computer Agent 20, Applications 15, and Components 30, and also Connectors 40 comprise one or more processors, with processing cores, and memory coupled to the one or more processors, wherein the memory includes one or more partitions and computer instructions which when executed by the one or more processors causes the one or more processors to perform said steps and operations described herein.

In some examples, service provider 501, includes but is not limited to a server, a server array or server farm, a web server, a network server, an Internet server, a work station, a mini-computer, a main frame computer, a supercomputer, a network appliance, a web appliance, a distributed computing system, multiprocessor systems, processor-based systems, a laptop computer, a tablet computer, a smartphone, a system-on-a-chip (SoC), or a combination thereof. In one example, service provider 501 is a disaggregated server. A disaggregated server is a server that breaks up components and resources into subsystems (e.g., network sleds). Disaggregated servers can be adapted to changing storage or compute loads as needed without replacing or disrupting an entire server for an extended period of time. A server could, for example, be broken into modular compute, I/O, power and storage modules that can be shared among other nearby servers.

Circuitry 520 having processing cores 522-1 to 522-$m$ may include various commercially available processors, including without limitation Intel® Atom®, Celeron®, Core (2) Duo®, Core i: 3, 5, 7 and 9, Itanium®, Pentium®, Xeon® or Xeon Phi® processors, ARM processors, and similar processors. Circuitry 520 may include at least one cache 535 to store data. In some embodiments, data table 51 and time table 52 and associated index ordering lists are stored in cache for faster processing and secrecy. The generated tables are pinned in memory, not stored on disk and encrypted with a key unique to each installation—derived from a proprietary secret and installation specific details According to some examples, primary memory 530 may be composed of one or more memory devices or dies which may include various types of volatile and/or non-volatile memory. Volatile types of memory may include, but are not limited to, dynamic random-access memory (DRAM), static random-access memory (SRAM), thyristor RAM (TRAM) or zero-capacitor RAM (ZRAM). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. In another embodiment, primary memory 530 may include one or more hard disk drives within and/or accessible by service provider 501.

Figures 6, 7:
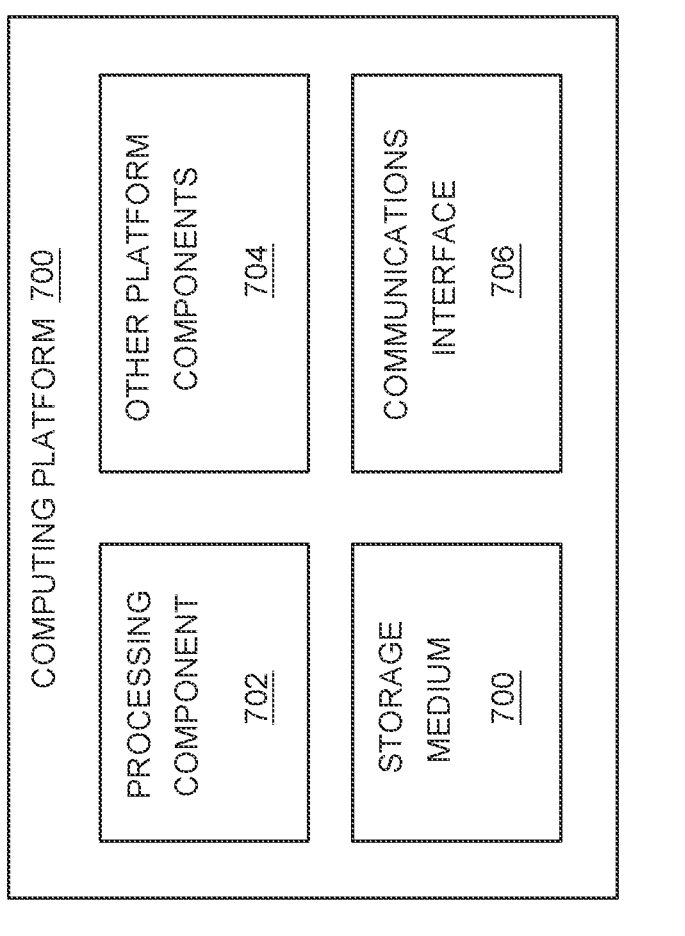
FIG. 6 illustrates an example of a storage medium suitable for use with format preserving tokenization of calendar dates in accordance with some embodiments.
FIG. 7 illustrates an example of a computing platform suitable for use with format preserving tokenization of calendar dates in accordance with some embodiments.

FIG. 6 illustrates an example of a storage medium 600. Storage medium 600 may comprise an article of manufacture. In some examples, storage medium 600 may include any non-transitory computer readable medium or machine readable medium, such as an optical, magnetic or semiconductor storage. Storage medium 600 may store various types of computer executable instructions, such as instructions 602 to implement method steps and logic flows described in the above figures. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

In accordance with various embodiments of the present disclosure, the methods described herein are intended for operation as software programs running on a computer processor or integrated on-chip code within static memory. Furthermore, software implementations can include, but not limited to, distributed processing or component/object distributed processing, parallel processing, or virtual machine processing can also be constructed to implement the methods described herein.

FIG. 7 illustrates an example computing platform 700. In some examples, computing platform 700 may include a processing component 702, other platform components 704 and/or a communications interface 706. According to some examples, processing component 702 may execute processing operations or logic for instructions stored on storage medium 600. Processing component 702 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 704 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EE- PROM), types of non-volatile memory such as 3-D cross-point memory that may be byte or block addressable. Non-volatile types of memory may also include other types of byte or block addressable non-volatile memory such as, but not limited to, multi-threshold level NAND flash memory, NOR flash memory, single or multi-level PCM, resistive memory, nanowire memory, FeTRAM, MRAM that incorporates memristor technology, STT-MRAM, or a combination of any of the above. Other types of computer readable and machine-readable storage media may also include magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 706 may include logic and/or features to support a communication interface. For these examples, communications interface 706 may include one or more communication interfaces that operate according to various communication protocols or standards to communicate over direct or network communication links or channels. Direct communications may occur via use of communication protocols or standards described in one or more industry standards (including progenies and variants) such as those associated with the peripheral component interconnect express (PCIe) specification. Network communications may occur via use of communication protocols or standards such those described in one or more Ethernet standards promulgated by the Institute of Electrical and Electronics Engineers (IEEE). For example, one such Ethernet standard may include IEEE 802.3. Network communication may also occur according to one or more OpenFlow specifications such as the OpenFlow Switch Specification.

The components and features of computing platform 700, including logic represented by the instructions stored on storage medium 600 may be implemented using any combination of discrete circuitry, ASICs, logic gates and/or single chip architectures. Further, the features of computing platform 700 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

In some embodiments, the data-centric system 100 of FIG. 1 is technically enabled by way of one or more computing platforms 700 for safeguarding and securing data that includes format preserving tokenization of calendar dates in data, including, but not limited to, HSMs, 10, Computer Agent 20, Applications 15, and Components 30, and also Connectors 40 in FIG. 2. It should be appreciated that the exemplary computing platform 700 shown in the block diagram of FIG. 7 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASIC, programmable logic devices (PLD), digital signal processors (DSP), FPGA, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine readable medium, such as an optical, magnetic or semiconductor storage. The embodiments are not limited in this context.

Some examples are described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

What is claimed, is:

1. A system to tokenize date and time data based on table shuffling and lookup index that preserves an original format of the date and time data with respect to a tokenized format, the system comprising:

a Computer Agent with centrally defined global parameters in a global protection policy; and
one or more Connectors communicatively coupled to the Computer Agent for managing and distributing said global protection policy to the one or more Connectors that convert and store a date or time entry, wherein
said one or more Connectors performs steps for:
reading said global parameters from said global protection policy;
generating a set of look-up tables in view of said global parameters, and then for each look-up table in the set of look-up tables:
a) ordering original values of date or time data in a first column, wherein the first column serves as an index for tokenization of said original values of date and time data;
b) shuffling said original values of date and time data using a seed value and a shuffling function to produce a random ordering of tokenized values in a second column, wherein the second column serves as the index for detokenization of said tokenized values;
thereby generating the set of look-up tables comprising:
date tables consisting of a year date table, a month date table, a 28-day month table, a 29-day month table, a 30-day month table, and a 31-day month table; and/or
time tables consisting of an hour table, a minutes table, and a seconds table,
wherein the one or more Connectors
processes a date entry for a separate year, month and day value thereby generating a tokenized date value in a same format as the original format of the date data for said date entry;
processes a time entry for separate hours, minutes and seconds value thereby generating a tokenized time value in a same format as the original format of the time data for said time entry.

2. The system of claim 1, wherein the seed value is either:
a user provided seed by way of the one or more Connectors; or a master seed that by way of the one or more Connectors creates a seed chain with derivative seeds.

3. The system of claim 1, wherein the one or more Connectors for processing the date entry for the separate year, month and day value;
looks up a year token for a year value in the year date table;
looks up a month token for a month value in the month date table;
if month token is 1, 3, 5, 7, 8, 10 or 12
looks up a day token for a day value in the 31 day table;
if month token is 4, 6, 9 or 11
looks up a day token for the day value in the 30 day table;
if month token is 2 and year token is not a leap year
looks up a day token for the day value in the 28 day table;
if month token is 2 and year token is a leap year
looks up a day token for the day value in the 29 day table.

4. The system of claim 1, wherein the one or more Connectors for processing the time entry for the separate hours, minutes and seconds value;
looks up a hours token for the hours value in the hour date table;
looks up a minutes token for the minutes value in the minute date table;
looks up a seconds token for the seconds value in the seconds table.

5. The system of claim 1, wherein
a first global parameter indicates said ordering;
a second global parameter indicates the shuffling function;
a third global parameter indicates whether the seed value is obtained from a user application, a component or a connector
wherein the first, second and third first global parameter are included in the defined global parameters.

6. The system of claim 1, wherein after the date table is generated, the one or more Connectors performs steps of:
breaking down a date value into individual entries for year, month and day;
tokenizing the date value in each date look-up table of the set of look-up tables by:
looking up the individual entry in the first column of a respective date look-up table;
identifying the index in the first column for said individual entry;
looking up a corresponding tokenized individual entry in the second column using said index; and
presenting the corresponding tokenized date as a format preserved representation of the date value,
thereby producing,
a tokenized date value from the format preserved representation of the date value that obfuscates the year, month and day of said date value in a same format.

7. The system of claim 6, wherein once said original values of date and time have been tokenized, the one or more Connectors performs steps of:
breaking down the format preserved representation of the tokenized date value into individual entries for year, month and day;
detokenizing the corresponding tokenized date in each look-up table by:
looking up the corresponding tokenized date in the second column;
identifying the index in the second column for said corresponding tokenized date;

looking up the date value in the first column using said index; and presenting the date value that represents the obfuscated year, month and day of the tokenized date value.

8. The system of claim 1, wherein after the time table is generated, the one or more Connectors performs steps of:

breaking down a time value into individual entries of hour, minutes and seconds;

tokenizing the time value in each time look-up table of the set of look-up tables by:

looking up the individual entry in the first column of a respective time look-up table;

identifying the index in the first column for said individual entry;

looking up a corresponding tokenized individual entry in the second column using said index; and presenting the corresponding tokenized time as a format preserved representation of the time value, thereby generating, the tokenized time value from the format preserved representation of the time value that obfuscates the hour, minutes and seconds of said time value in a same format.

9. The system of claim 8, wherein once said original values of date and time have been tokenized, the one or more Connectors performs steps of:

breaking down the format preserved representation of the tokenized time value into individual entries for hours, minutes and seconds;

detokenizing the corresponding tokenized time in each look-up table by:

looking up the corresponding tokenized time in the second column;

identifying the index in the second column for said corresponding tokenized time;

looking up the time value in the first column using said index; and presenting the time value that represents the obfuscated hours, minutes and seconds of the tokenized date value.

10. The system of claim 1, wherein said set of look-up tables are temporarily stored in system memory and not on hard disk, and encrypted with a key unique to each installation of said one or more Connectors, wherein said Computer Agent and one or more Connectors comprise one or more processors and memory coupled to the one or more processors, wherein the memory includes one or more partitions and computer instructions which when executed by the one or more processors causes the one or more processors to perform said steps and operations.

11. A method to tokenize date and time data based on table shuffling and lookup index that preserves an original format of the date and time data with respect to a tokenized format, the method comprising steps by a Computer Agent with centrally defined global parameters in a global protection policy; and one or more Connectors communicatively coupled to the Computer Agent for managing and distributing said global protection policy to the one or more Connectors that convert and store a date or time entry, wherein said one or more Connectors performs operations for:

reading said global parameters from said global protection policy;

generating a set of look-up tables in view of said global parameters, and then for each look-up table in the set of look-up tables:

a) ordering original values of date or time data in a first column, wherein the first column serves as an index for tokenization of said original values of date and time;

b) shuffling said original values of date and time using a seed value and a shuffling function to produce a random ordering of tokenized values in a second column, wherein the second column serves as the index for detokenization of said tokenized values;

thereby generating the set of look-up tables comprising:

date tables consisting of a year date table, a month date table, a 28-day month table, a 29-day month table, a 30-day month table, and a 31-day month table; and/or time tables consisting of an hour table, a minutes table, and a seconds table, wherein the seed value is either:

a user provided seed by way of the one or more Connectors; or a master seed that by way of the one or more Connectors creates a seed chain with derivative seeds, wherein the one or more Connectors processes a date entry for a separate year, month and day value thereby generating a tokenized date value in a same format as the original format of the date data for said date entry;

processes a time entry for separate hours, minutes and seconds value thereby generating a tokenized time value in a same format as the original format of the time data for said time entry.

12. The method of claim 11, wherein the one or more Connectors for processing the date entry for the separate year, month and day value;

looks up a year token for a year value in the year date table;

looks up a month token for a month value in the month date table;

if month token is 1, 3, 5, 7, 8, 10 or 12 looks up a day token for a day value in the 31 day table;

if month token is 4, 6, 9 or 11 looks up a day token for the day value in the 30 day table;

if month token is 2 and year token is not a leap year looks up a day token for the day value in the 28 day table;

if month token is 2 and year token is a leap year looks up a day token for the day value in the 29 day table.

13. The method of claim 11, wherein the one or more Connectors for processing the time entry for the separate hours, minutes and seconds value; looks up a hours token for the hours value in the hour date table; looks up a minutes token for the minutes value in the minute date table; looks up a seconds token for the seconds value in the seconds table.

14. The method of claim 11, wherein after the date table is generated, the one or more Connectors performs steps of:

breaking down a date value into individual entries for year, month and day;

tokenizing the date value in each date look-up table of the set of look-up tables by:

looking up the individual entry in the first column of a respective date look-up table;

identifying the index in the first column for said individual entry;

looking up a corresponding tokenized individual entry in the second column using said index; and presenting the corresponding tokenized date as a format preserved representation of the date value, thereby producing generating the tokenized date value from the format preserved representation of the date value that obfuscates the year, month and day of said date value in a same format, and, wherein once said original values of date and time have been tokenized, the one or more Connectors performs steps of:

breaking down the format preserved representation of the tokenized date value into individual entries for year, month and day;

detokenizing the corresponding tokenized date in each look-up table by:

looking up the corresponding tokenized date in the second column;

identifying the index in the second column for said corresponding tokenized date;

looking up the date value in the first column using said index; and presenting the date value that represents the obfuscated year, month and day of the tokenized date value.

15. The method of claim 11, wherein after the time table is generated, the one or more Connectors performs steps of:

breaking down a time value into individual entries of hour, minutes and seconds;

tokenizing the time value in each time look-up table of the set of look-up tables by:

looking up the individual entry in the first column of a respective time look-up table;

identifying the index in the first column for said individual entry;

looking up a corresponding tokenized individual entry in the second column using said index; and presenting the corresponding tokenized time as a format preserved representation of the time value, thereby generating, the tokenized time value from the format preserved representation of the time value that obfuscates the hour, minutes and seconds of said time value in a same format, and, wherein once said original values of date and time have been tokenized, the one or more Connectors performs steps of:

breaking down the format preserved representation of the tokenized time value into individual entries for hours, minutes and seconds;

detokenizing the corresponding tokenized time in each look-up table by:

looking up the corresponding tokenized time in the second column;

identifying the index in the second column for said corresponding tokenized time;

looking up the time value in the first column using said index; and presenting the time value that represents the obfuscated hours, minutes and seconds of the tokenized date value.

* * * * *